(12) United States Patent
Dunn et al.

(10) Patent No.: US 9,960,575 B2
(45) Date of Patent: May 1, 2018

(54) SHEAVE FOR ELECTRICAL STRINGING BLOCK

(71) Applicant: Sherman + Reilly, Inc., Chattanooga, TN (US)

(72) Inventors: Michael Hanson Dunn, Atlanta, GA (US); Douglas Bruce MacDonald, Dawsonville, GA (US)

(73) Assignee: SHERMAN + REILLY, INC., Chattanooga, TN (US)

(*) Notice: Subject to any disclaimer, the term of this patent is extended or adjusted under 35 U.S.C. 154(b) by 0 days. days.

(21) Appl. No.: 15/004,384

(22) Filed: Jan. 22, 2016

(65) Prior Publication Data
US 2017/0214227 A1    Jul. 27, 2017

(51) Int. Cl.
H02G 1/02        (2006.01)
H02G 1/04        (2006.01)

(52) U.S. Cl.
CPC ...................... H02G 1/04 (2013.01)

(58) Field of Classification Search
CPC ........................................................ H02G 1/02
See application file for complete search history.

(56) References Cited

U.S. PATENT DOCUMENTS

| 2,738,681 | A | * | 3/1956 | Schultz, Jr. | F16H 55/44 474/169 |
| 2,806,380 | A | * | 9/1957 | Martin | H02G 1/04 254/134.3 PA |
| 3,286,539 | A | * | 11/1966 | Loper | F16H 55/44 29/463 |
| 4,037,486 | A | * | 7/1977 | Schultz, Jr. | F16H 55/44 29/892.11 |
| 7,922,424 | B2 | * | 4/2011 | Clark, II | B23D 57/0007 405/156 |
| 2009/0195083 | A1 | * | 8/2009 | Devine | H02G 1/02 307/147 |

OTHER PUBLICATIONS

2015 Block Product Guide, May addition, 72 Series (Multiversal) Blocks, p. 10.
Photographs of prior art sheaves. 16 images.

* cited by examiner

*Primary Examiner* — William H Mayo, III
*Assistant Examiner* — Hiram E Gonzalez
(74) *Attorney, Agent, or Firm* — Klintworth & Rozenblat IP LLP

(57) ABSTRACT

An electrical stringing block in accordance with some example embodiments includes a sheave formed of a pair of metal plates which are joined together. Each plate includes an angled section, a planar section extending from an outer edge of the angled section, and a curved section extending from an outer edge of the planar section. The plates are joined together at the planar sections. Each angled section is continuous.

13 Claims, 6 Drawing Sheets

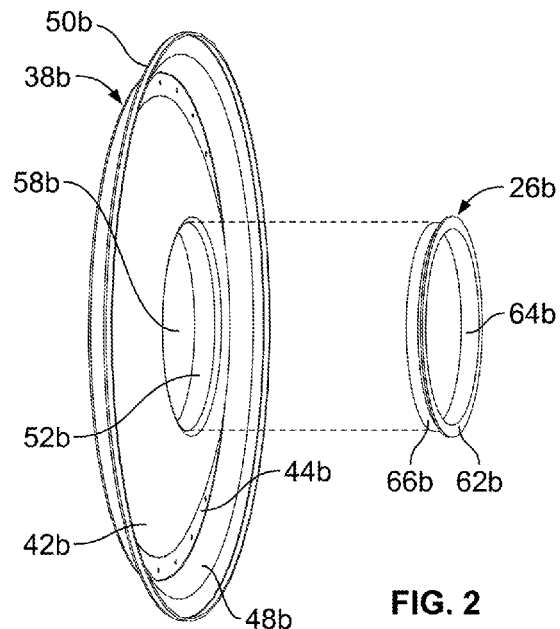
FIG. 2
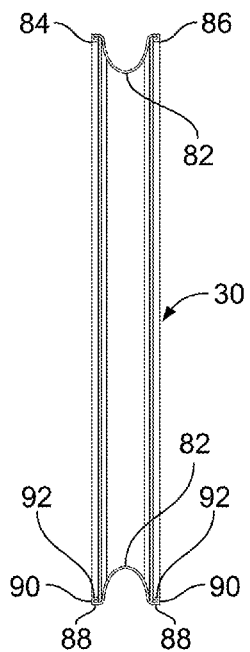
FIG. 8
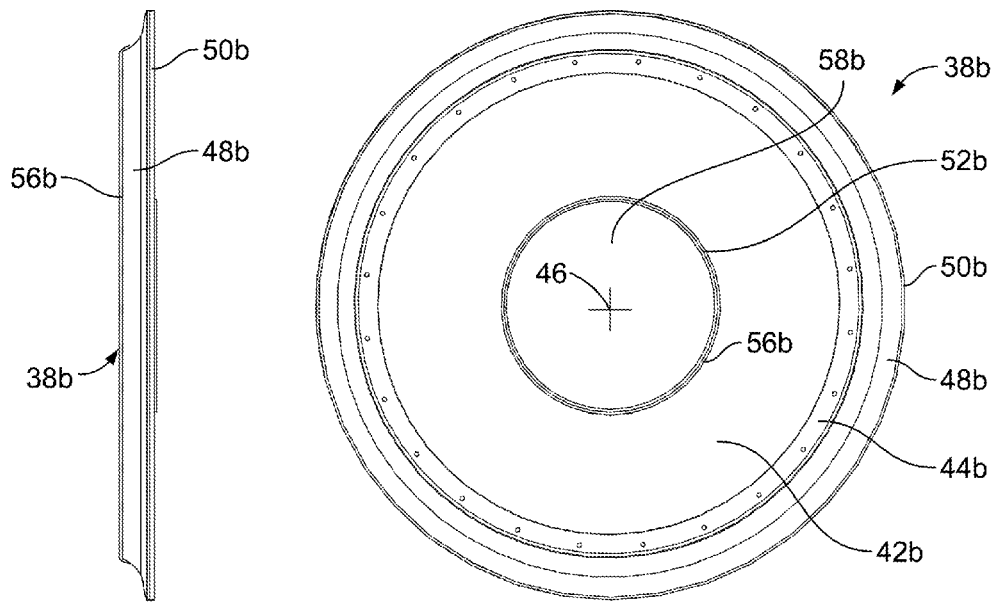
FIG. 3
FIG. 4

SHEAVE FOR ELECTRICAL STRINGING BLOCK

FIELD OF THE DISCLOSURE

The present disclosure generally relates to the field of power transmission and distribution, and relates specifically to a sheave or sheave block for an electrical stringing block for installation of conductors at overhead electrical transmission and distribution lines or any other aerial cables installation.

BACKGROUND

High-tension wires are strung from a power source through a maze of electrical suspension towers and telephone poles, in order to transfer power from the source to the consumer. In order to string the high-tension wires, electrical stringing blocks are installed at towers or powerpoles for overhead transmission and distribution lines for pulling the wires. A lead rope is strung through the electrical stringing blocks, either manually or by a helicopter. Then, the lead rope is exchanged by a single or bundled conductor forming the wire, running on the electrical stringing blocks. Finally the wire is transferred from the electrical stringing blocks to clamps.

Standard construction for an electrical stringing block include cast aluminum sheaves or molded nylon sheaves, supported by bearings on a solid axle, suspended in a cast or fabricated metal frame. The sheaves have a plurality of spokes, which are optimized for casting. The weight of cast aluminum sheaves is quite significant, particularly in the case of larger diameter sheaves.

SUMMARY

An electrical stringing block in accordance with some example embodiments includes a sheave formed of a pair of metal plates which are joined together. Each plate includes an angled section, a planar section extending from an outer edge of the angled section, and a curved section extending from an outer edge of the planar section. The plates are joined together at the planar sections. Each angled section is continuous.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 2 is a perspective view of a plate and a bearing which forms parts of the electrical stringing block of FIG. 1;

FIG. 3 is a side elevation view of the plate of FIG. 2;

FIG. 4 is a front elevation view of the plate of FIG. 2;

FIG. 8 is a cross-sectional view of a lining which forms part of the electrical stringing block of FIG. 1.

DETAILED DESCRIPTION

Figure 1:
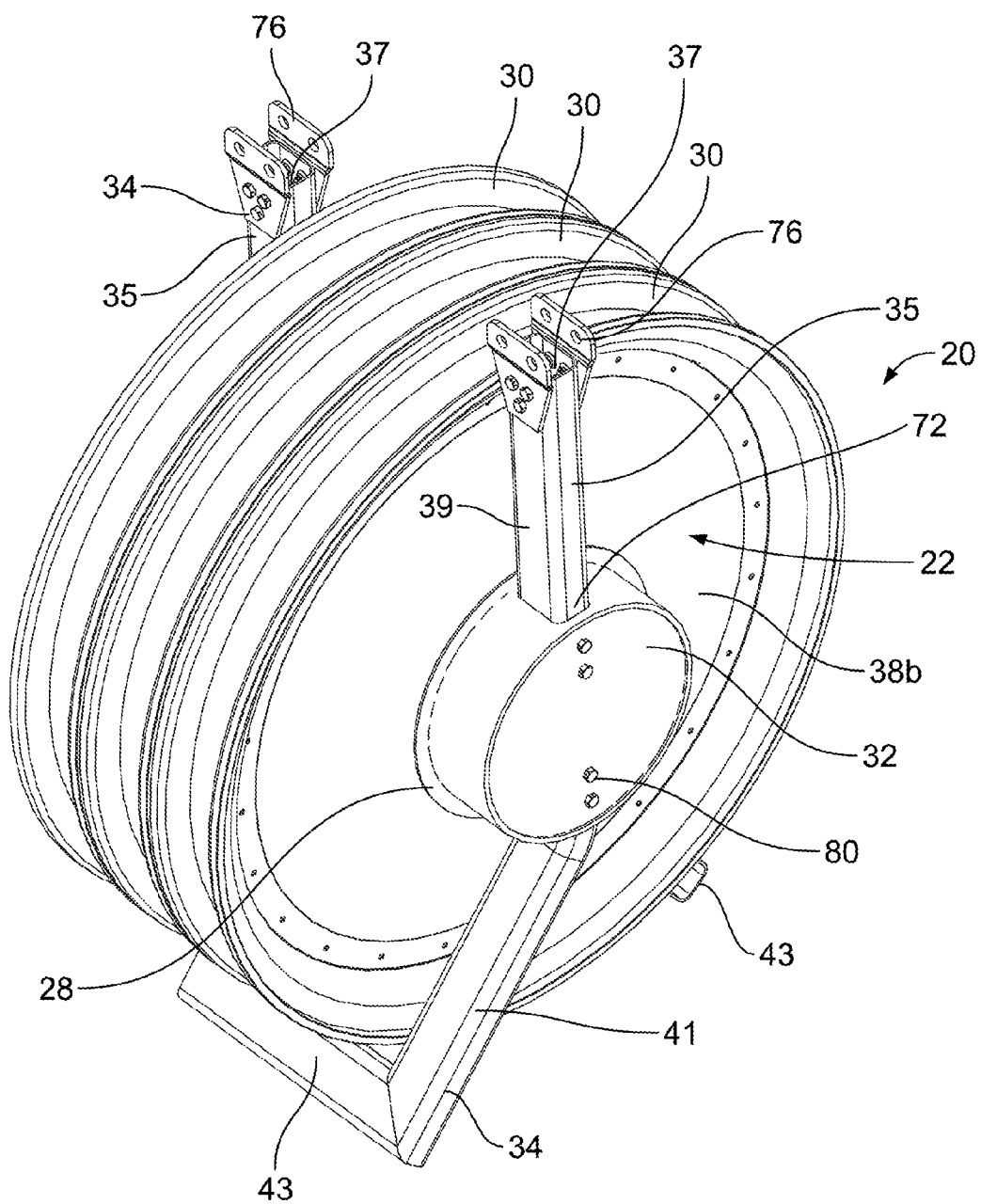
FIG. 1 is a perspective view of an electrical stringing block which is formed in accordance with a first embodiment of the present disclosure.
Figure 5:
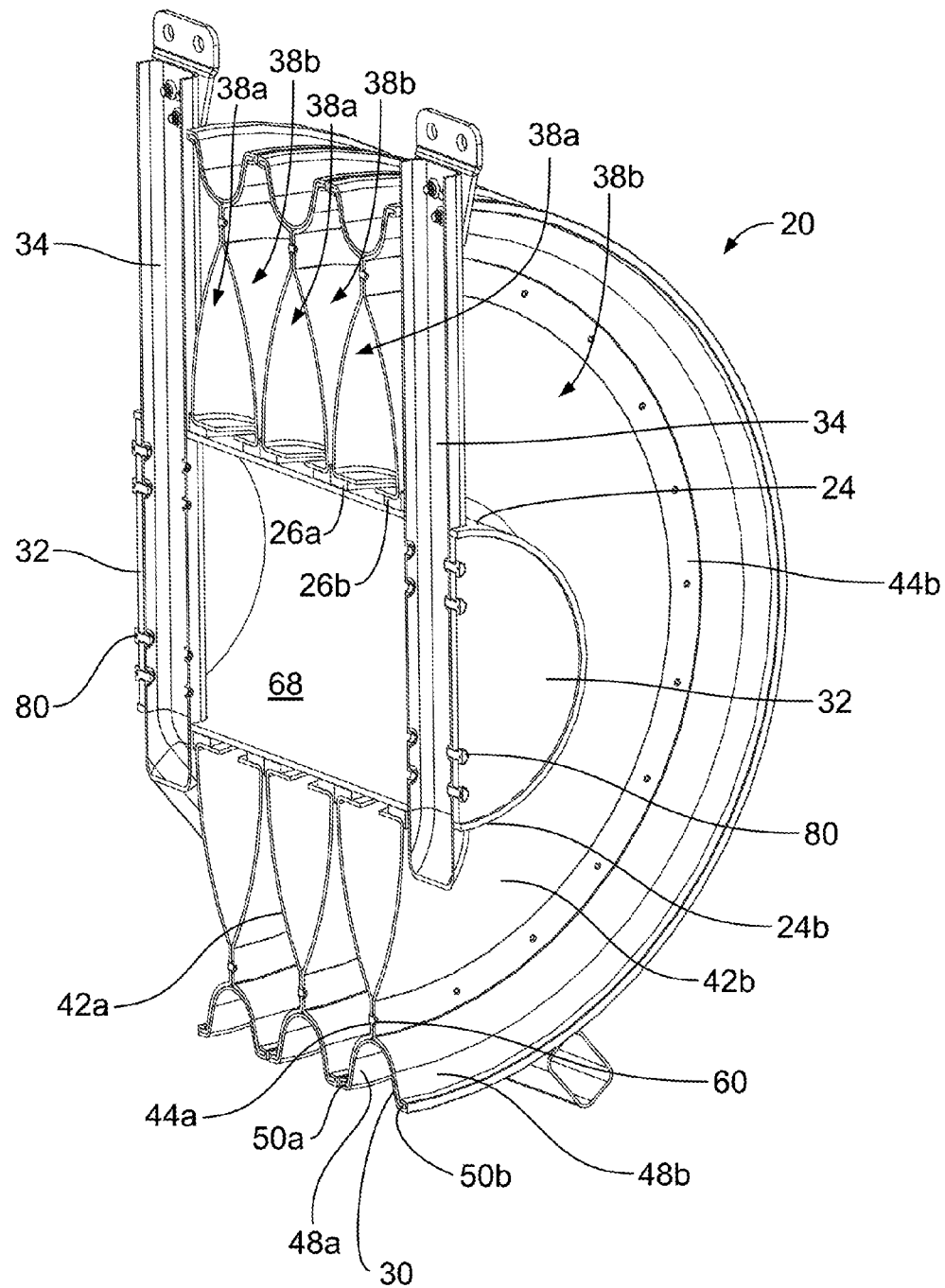
FIG. 5 is a cross-sectional view of the electrical stringing block of FIG. 1 shown in perspective.
Figure 6:
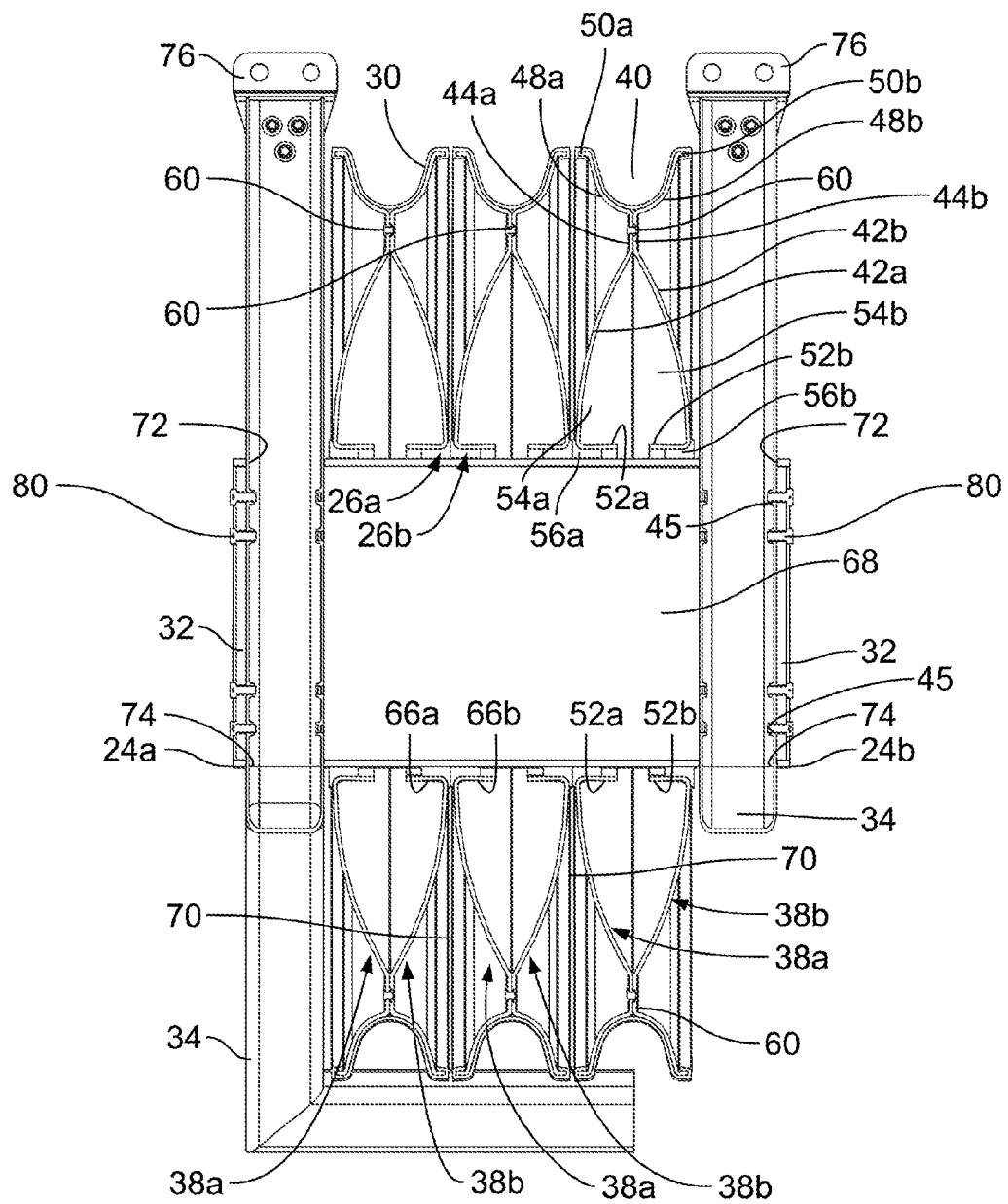
FIG. 6 is a cross-sectional view of the electrical stringing block of FIG. 1.
Figure 7:
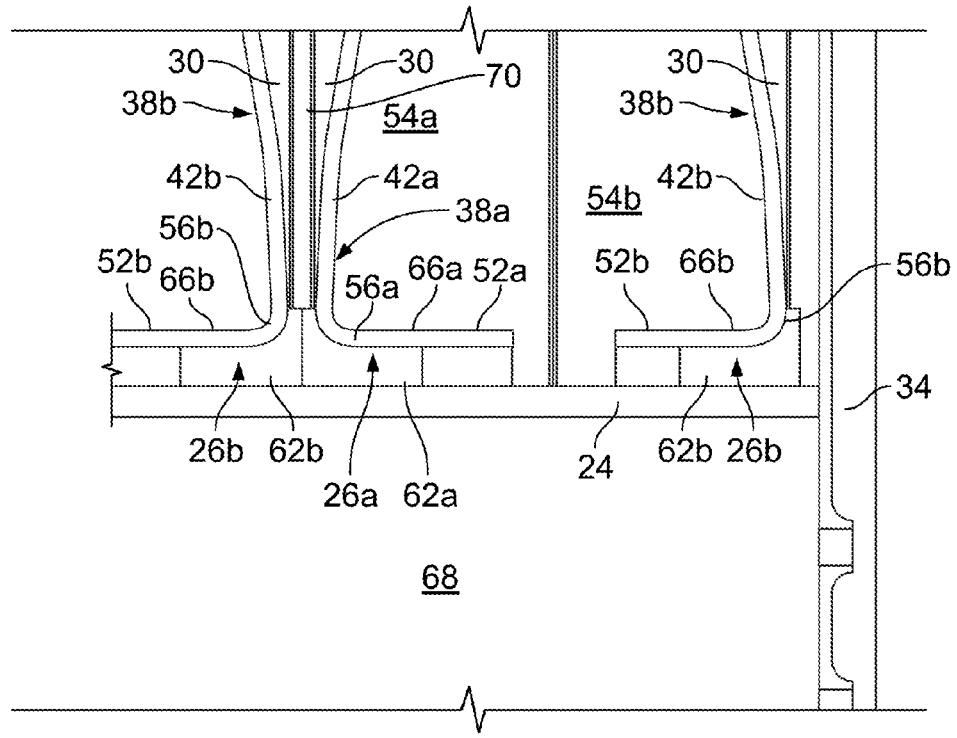
FIG. 7 is an enlarged, partial cross-sectional view of the electrical stringing block of FIG. 1.
Figure 7A:
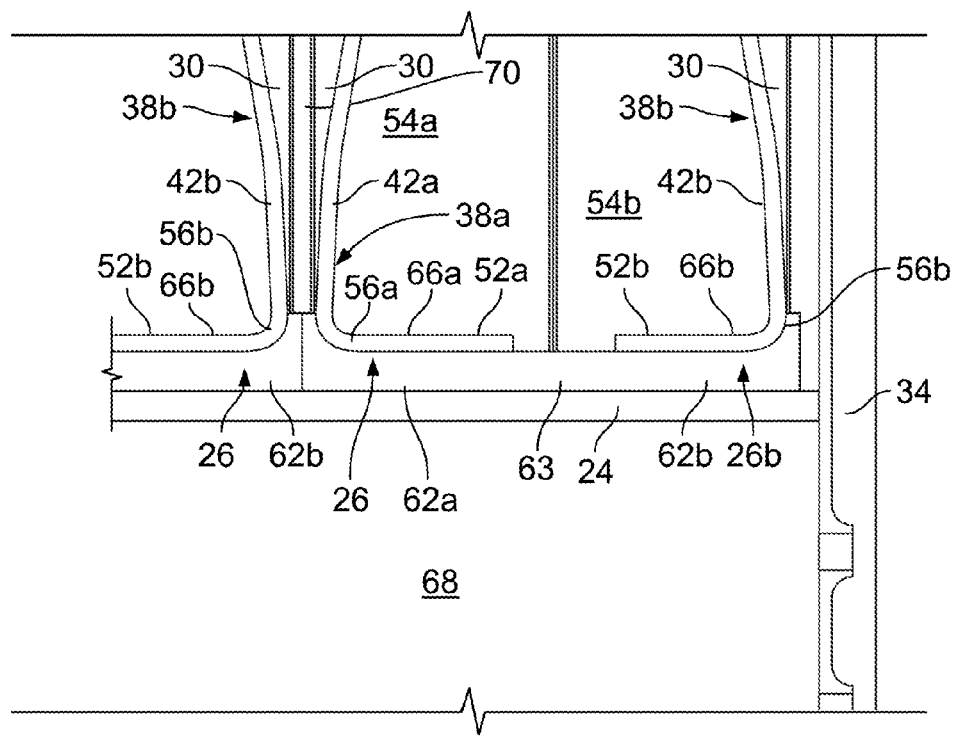
FIG. 7A is an enlarged, partial cross-sectional view of an alternate electrical stringing block with a modified bearing.

An electrical stringing block 20 is disclosed. The electrical stringing block 20 is mounted on a high tower or powerpole and is used to route a single or bundled conductor(s) (not shown) to provide power from a source to a consumer.

The electrical stringing block 20 is formed from at least one metal sheave 22 mounted on a metal tubular axle 24 by at least one bearing 26, 26a, 26b, a non-conductive lining 30 mounted on the sheave 22, metal cover plates 32 closing the ends of the axle 24, and a pair of metal support arms 34 extending through the axle 24. The support arms 34 are used to mount the electrical stringing block 20 to the tower or powerpole. As shown by way of non-limiting example, three sheaves 22 are mounted on the axle 24. It is to be understood that a single sheave 22 may be provided, two sheaves 22 may be provided, or more than three sheaves 22 may be provided. When more than one sheave 22 is provided, a bundle block is formed. It is to be understood that a single bearing 26 may be provided for each sheave 22 or two bearings 26a, 26b may be provided for each sheave 22.

Each sheave 22 is identically formed. Each sheave 22 is formed of a pair of metal plates 38a, 38b which are joined together to form a generally U-shaped groove 40 into which the lead rope and conductors seat during the stringing process. As used herein, the term "joined together" is defined such that the plates 38a, 38b can be directly abutting each other, or that the plates 38a, 38b are operationally/functionally joined together where the plates 38a, 38b may at least partially sandwich an intermediate piece (not shown) used to join the plates 38a, 38b together. The plates 38a, 38b may be formed of aluminum. Each metal plate 38a, 38b forms one-half of the sheave 22. Each plate 38a, 38b may have a large diameter, for example, but not limited to 12 inches to 48 inches in diameter.

Figure 9:
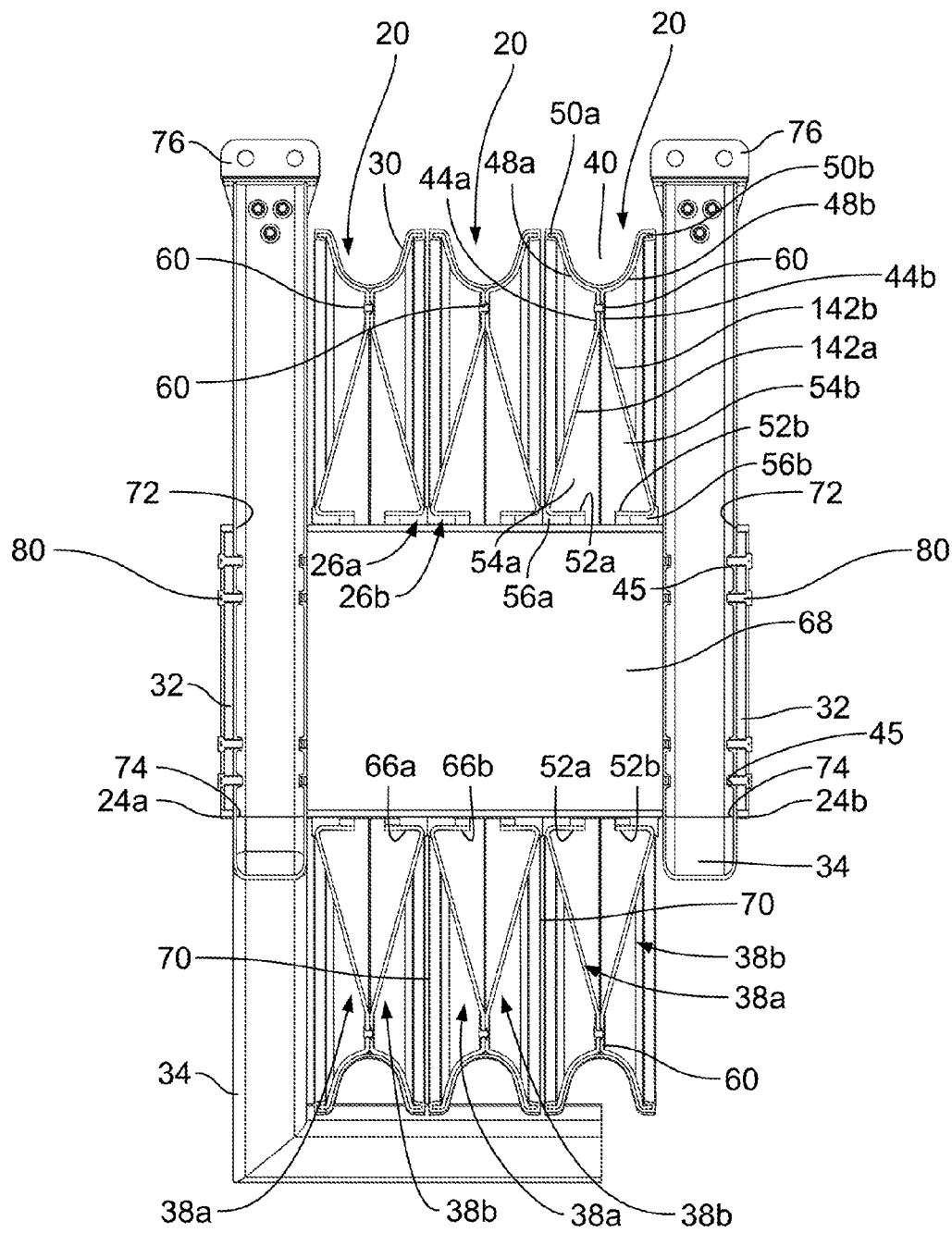
FIG. 9 is a cross-sectional view of a modified sheave in an electrical stringing block.

Each plate 38a, 38b has an inner rim section 52a, 52b which is parallel to the centerline 46 of the plate 38a, 38b and which defines a central aperture 58a, 58b through the plate 38a, 38b, an inner angled section 42a, 42b which extends at an angle from the inner rim section 52a, 52b to an intermediate planar section 44a, 44b, a curved section 48a, 48b which extends from an outer edge of the intermediate planar section 44a, 44b and generally forms one half of the generally U-shape groove 40 as described herein, and an outer rim section 50a, 50b which extends from an outer edge of the curved section 48a, 48b and is parallel to the centerline 46 of the plate 38a, 38b. The inner rim section 52a, 52b extends from an inner edge of the inner angled section 42a, 42b and is parallel to the outer rim section 50a, 50b. The intermediate planar section 44a, 44b extends radially outwardly from the circular outer edge of the inner angled section 42a, 42b and extends radially outwardly from a centerline 46 of the plate 38a, 38b. The intermediate planar section 44a, 44b is perpendicular to the inner rim section 52a, 52b and to the outer rim section 50a, 50b when viewed in cross-section. The inner angled section 42a, 42b can be frusto-conical as shown in FIGS. 1-7A or can be planar in cross-section as shown in FIG. 9. The edges of each of the inner angled sections 42a, 42b, intermediate planar sections 44a, 44b, curved sections 48a, 48b, outer rim sections 50a, 50b, and inner rim sections 52a, 52b are circular. The inner angled section 42a, 42b and the inner rim section 52a, 52b define a concave recess 54a, 54b on one side thereof. The corner 56a, 56b formed between the inner rim section 52a, 52b and inner angled section 42a, 42b may be curved. The wall forming the inner angled section 42a, 42b is not interrupted by any apertures, such that the inner angled section 42a, 42b is continuous. Therefore, "continuous" as used in reference to the wall forming the inner angled section 42a, 42b means that the wall forming the inner angled section 42a, 42b is not interrupted by any apertures.

The plates 38a, 38b may be formed by any of several processes provided the plates 38a, 38 are formed as one continuous component. Such processes include, but are not limited to, metal spinning, metal stamping, pressing, or forging. As each plate 38a, 38b is formed as one continuous component, the plates 38a, 38b do not contain any structural welds. Therefore, "continuous" as used in reference to the plates 38a, 38b means that the plates 38a, 38b do not contain any structural welds. Also, such processes are more cost effective than casting since casting requires a significant amount of material. Such processes result in a lighter weight plate 38a, 38b than casting. Such processes also result in a plate 38a, 38b which evenly distributes the load on the resulting sheave 22.

To form the sheave 22, adjacent plates 38a, 38b are joined together at the intermediate planar sections 44a, 44b such that the central apertures 58a, 58b align. As used herein, the term "joined together" is defined such that the intermediate planar sections 44a, 44b can be directly abutting each other or that that the intermediate planar sections 44a, 44b are operationally/functionally joined together where the intermediate planar sections 44a, 44b may at least partially sandwich an intermediate piece (not shown) used to join the intermediate planar sections 44a, 44b together. The plates 38a, 38b are joined together at joint 60 which may be formed by riveting, fastening, welding, adhesion, alone or in combination, or by other known processes, through the intermediate planar sections 44a, 44b to provide a single structural sheave shape with similar mechanical properties to the prior art spoked sheave. The free ends of the inner rim section 52a, 52b may be spaced apart from each other as shown in the drawings, or may contact each other. The curved sections 48a, 48b form the base of the generally U-shaped groove 40.

The lining 30 is provided on the sheave 22 and mirrors the shape of the surfaces of the outer rim sections 50a, 50b and the curved sections 48a, 48b to complete the formation of the generally U-shaped groove 40. As such, the lining 30 has a curved inner section 82 which is generally U-shaped, and a rim 84, 86 which extend from the opposite ends of the curved inner section 82. Each rim 84, 86 is formed from a first planar section 88 which extends outwardly from the curved inner section 82 and is parallel to the centerline 46 of the plates 38a, 38b, a second planar section 90 which is perpendicular to the first planar section 88, and a third planar section 92 which is parallel to the first planar section 88 and the centerline 46 of the plates 38a, 38b. As shown, the sections 88, 90, 92 wraps around the surfaces of the outer rim sections 50a, 50b, but the sections 90 and 92 may be eliminated. The lining 30 is formed of suitable non-conductive material, such as urethane, neoprene, or polyurethane. The lining may also comprise of a conductive combinations of materials to promote grounding. The lining 30 may be overmolded onto the outer rim sections 50a, 50b and the curved sections 48a, 48b. Alternatively, the lining 30 may be formed by an extruded or injection molded resin which is trapped between the two plates 38a, 38b during assembly to eliminate cost and supply complexity associated with overmolding. As another alternative, the lining 30 may be separately formed and wrapped onto the outer rim sections 50a, 50b and the curved sections 48a, 48b. The lining 30 on each sheave 22 is continuous to prevent the entry of contaminants, such as ice, dirt or any other outside object, and to prevent the entry of wildlife between the plates 38a, 38b of each sheave 22.

As shown in FIG. 8, if two bearings 26a, 26b are provided, each bearing 26a, 26b may be formed of a circular ring 62a, 62b having a central passageway 64a, 64b therethrough and a race 66a, 66b formed on an outer surface of the ring 62a, 62b. The ring 62a, 62b seats partially within the central aperture 58a, 58b of the inner rim section 52a, 52b and extends partially outwardly from the corner 56a, 56b of the respective plate 38a, 38b. The bearings 26a, 26b may be press fit into plates 38a, 38b. The race 66a, 66b seats against and mirrors the shape of the inner rim section 52a, 52b and the corner 56a, 56b. The race 66a, 66b of some embodiments may be coated with a slip promoting material, such as polytetrafluoroethylene (PTFE) which is commonly sold under the brand name TEFLON, or may be formed of a composite such as wound mono-filament glass fiber, epoxy, PTFE. The slip promoting material may be bonded to race 66a, 66b. If a single bearing 26 is provided, as shown in FIG. 8A, the rings 62a, 62b are integrally formed with each other and have a central ring portion 63 which extends between the inner rim sections 52a, 52b. Alternatively, roller bearings having inner and outer races may be used as the bearings 26a, 26b. The bearings that are pressed into the plates 38a, 38b may also be ball bearings or any other common bearing that can be configured to be installed into the sheave assembly 30 to allow rotation of the sheave 22.

The tubular axle 24 may be solid or may be hollow. If the axle 24 is solid, the axle 24 may be formed of one consistent material or several laminated materials. If the axle 24 is hollow, a central passageway 68 is formed through the axle 24, and this reduces weight of the electrical stringing block 20 versus a solid axle. The axle 24 extends through the aligned central passageways 64a, 64b of the bearings 26, 26a, 26b and has opposite end portions 24a, 24b which extend outwardly from the outermost plates 38a, 38b of the sheaves 22. The bearings 26, 26a, 26b may be slip fit over axle 24. Adjacent bearings 26, 26a, 26b abut against each other and forms spaces 70 between adjacent sheaves 22 if more than one sheave 22 is mounted on the axle 24. Each end portion 24a, 24b has a pair of diametrically opposed apertures 72, 74 therethrough.

A non-limiting example of support arms 34 that may be used are shown in the drawings. As shown in the drawings, each support arm 34 may be formed of a tube 35 having a rectangular cross-section. The tube 35 defines a central passageway 37 which extends from a top end to a bottom end thereof. Each support arm 34 may have a first vertical section 39 which extends through the respective apertures 72, 74 of the axle 24, a second angled section 41 which extends from a bottom end of the first section 39, and a third horizontal section 43 which extends from a bottom end of the second section 41. The support arms 34 are affixed to the axle 24, such as by welding. The electrical stringing block 20 can rest on a surface on the third sections 43. The third sections 43 are offset from each other on opposite sides of a centerline of the electrical stringing block 20 which extends along the length of the axle 24. Alternatively, the third sections 43 may be connected to each other to form a continuous support arm 34 that is generally U-shaped. Each section 39 has a connection 76 which is used to connect the arms 34 to the tower or powerpole. If a single sheave 22 is provided, one or two support arms 34 may be used. The support arms 34 may be made of metal, such as steel. The first section 39 of each support arm 34 has at least one aperture 45 formed therethrough for acceptance of a fastener 80 as described herein. The aperture(s) 45 may be formed by flow drilling to form a buildup of material around the aperture(s) 45. After the flow drilling process, the aperture(s) 45 are threaded. Alternatively, the second and third sections 41, 43 can be separately formed from the first section 39. The support arms 34 may be connected together by a member connecting the third sections 43. More than one second section 41 and third section 43 may extend from the first section 39. Alternatively, the second section 41 and third section 43 of each support arm 34 can be eliminated and the electrical stringing block 20 attached to the tower or powerpole only using the first section(s) 39.

The cover plate 32 seats within each end portion 24*a*, 24*b* of the axle 24, if hollow, and abuts against the respective support arm 34. The cover plate 32 may be formed of aluminum. Prior to attachment to the respective support arm 34, the cover plate 32 may have a generally convex shape, which may be formed by bending the cover plate 32 or by forming the cover plate 32 as hemi-spherical. The cover plate 32 is attached to the respective support arm 34 by rivets or threaded fasteners 80, by welding, by adhesion, or by another known process. During this attachment, the cover plate 32 flattens to tightly engage with the inner diameter of the axle 24 formed by the passageway 68. In the installed condition, the cover plate 32 is circular which aids in maintaining the circular shape of the tubular axle 24. The cover plate 32 also prevents the introduction of outside objects, such as dirt, ice and wildlife, into the hollow axle 24.

Stiffening plates (not shown) may be press fit into the axle 24, if hollow, and positioned along the length of the axle 24. These stiffening plates may be formed of aluminum, and aid in maintaining the circular shape of the tubular axle 24. The stiffening plates may be mounted at the midpoint of each sheave 22.

In use, a lead rope or conductor is wound around one of the sheaves 22 and rides in the bottom of the generally U-shaped groove 40 of the sheave 22. The sheave 22 rotates on the bearings 26, 26*a*, 26*b*. Since the races 66*a*, 66*b* of the bearings 26, 26*a*, 26*b* may have the slip promoting material, no grease is required in this application. The lining 30 protects the conductor passing over the sheave 22.

The sections 88 of the lining 30 may be molded or painted in a color that contrasts with the section 82 of the lining 30 so that the turning of the sheave 22 may be seen from a far distance, such as a mile (with the use of binoculars). The lining 30 may be textured (for example having a ribs, a diamond shape, etc. embossed or formed therein) and painted with a curable paint. The paint within the concave portions of the texturing does not wear off by the contact with the lead rope or conductor to provide the contrasting colors. The sheave 22 may thus be seen spinning from a distance.

As a result of the structure of the sheave 22, the weight is substantially reduced from that of prior art cast sheaves and the sheave 22 has a managed failure mode. The sheave 22 weighs between 30% and 50% of a cast prior art sheave. Reduced material content and efficient production processes, significantly reduces the cost of the sheave 22 by as much as 50% from prior art sheave. Since these electrical stringing blocks 20 are often carried by helicopter, this reduces the load on the helicopter.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

What is claimed is:

1. A sheave capable of being used in an electrical stringing block for stringing a conductor to a tower or powerpole, comprising:
   a pair of metal plates, each plate comprising an inner rim section having first and second edges and a length defined therebetween, an angled section having inner and outer edges and a length defined therebetween, a planar section having inner and outer edges and a length defined therebetween, and a curved section having inner and outer edges, the inner edge of the angled section extending from the second edge of the inner rim section at a corner, the outer edge of the angled section extending from the inner edge of the planar section, each angled section being continuous, the inner edge of the curved section extending from the outer edge of the planar section,
   the plates being joined together at the planar sections and forming a central aperture therethrough which is defined by the inner rim sections, the first edges of the inner rim sections facing each other, the central aperture defining a centerline therethrough, wherein each inner rim section extends in a direction parallel to the centerline, wherein each planar section extends in a direction perpendicular to the centerline.

2. The sheave of claim 1, wherein the angled section of each plate is frusto-conical along the entire length thereof.

3. The sheave of claim 1, wherein the angled section of each plate is planar in cross-section along the entire length thereof.

4. The sheave of claim 1, wherein the plates are joined together by any one or more of riveting, fastening, welding, adhesion.

5. The sheave of claim 1, wherein each plate is formed by one of metal spinning, metal stamping, pressing, or forging.

6. The sheave of claim 1, further comprising a non-conductive lining attached to the curved sections.

7. The sheave of claim 6, wherein the non-conductive lining comprises one or more portions having a color that is different than other portions of the non-conductive lining.

8. An electrical stringing block for stringing a conductor to a tower or powerpole, comprising:
   an axle;
   at least one bearing mounted on the axle;
   at least one metal sheave mounted on the axle by the at least one bearing, the sheave being rotatable relative to the axle, the at least one metal sheave comprising a pair of metal plates,
   each plate comprising an inner rim section having first and second edges and a length defined therebetween, an angled section having inner and outer edges and a length defined therebetween, a planar section having inner and outer edges and a length defined therebetween, and a curved section having inner and outer edges, the inner edge of the angled section extending from the second edge of the inner rim section at a corner, the outer edge of the angled section extending from the inner edge of the planar section, each angled section being continuous, the inner edge of the curved section extending from the outer edge of the planar section,
   the plates being joined together at the planar sections and forming a central aperture therethrough which is defined by the inner rim sections, the first edges of the inner rim sections facing each other, the axle being mounted through the central aperture, the central aperture defining a centerline therethrough, wherein each inner rim section extends in a direction parallel to the centerline, wherein each planar section extends in a direction perpendicular to the centerline;
   the at least one bearing engaging with at least one of the inner rim sections of the plate; and
   at least one support arm attached to the axle configured to support mounting the electrical stringing block to an associated tower or powerpole.

9. The electrical stringing block of claim 8, wherein the angled section of each plate is frusto-conical along the entire length thereof.

10. The electrical stringing block of claim 8, wherein the angled section of each plate is planar in cross-section along the entire length thereof.

11. The electrical stringing block of claim 8, wherein each plate is formed by one of metal spinning, metal stamping, pressing, or forging.

12. The electrical stringing block of claim 8, further comprising a non-conductive lining attached to the curved sections.

13. The electrical stringing block of claim 12, wherein the non-conductive lining comprises one or more portions having a color that is different than other portions of the non-conductive lining.

* * * * *